United States Patent [19]
Sackoff et al.

[11] 3,900,644
[45] Aug. 19, 1975

[54] HEAT RESISTANT LAMINATE

[75] Inventors: Martin M. Sackoff; Gregory F. Pulaski, both of Glen Falls, N.Y.

[73] Assignee: United Merchants and Manufacturers, Inc., New York, N.Y.

[22] Filed: Mar. 20, 1973

[21] Appl. No.: 343,159

[52] U.S. Cl. ............... 428/40; 428/215; 428/220; 428/458; 428/481
[51] Int. Cl. .............................. B32b ; B32b 15/08
[58] Field of Search ....... 161/6, 403, 216, 227, 413, 161/406, 168

[56] References Cited
UNITED STATES PATENTS
3,170,833 2/1965 Noyes ............................ 161/186
3,503,831 3/1970 Oyama .................................. 161/6
3,567,571 3/1971 Martinovich ....................... 161/406

*Primary Examiner*—Mayer Weinblatt
*Assistant Examiner*—Edith R. Buffalow
*Attorney, Agent, or Firm*—Michael A. Caputo; John P. McGann; Jules E. Goldberg

[57] ABSTRACT

A heat resistant laminate suitable for kitchen countertop surfaces which comprises a top layer of a flexible, transparent polymeric sheet having a high heat resistance, a second layer of a flexible, hard surfaced material, a third layer of a flexible metal foil heat sink, a fourth layer of a pressure sensitive adhesive and a bottom layer of a sheet of release material.

8 Claims, 1 Drawing Figure

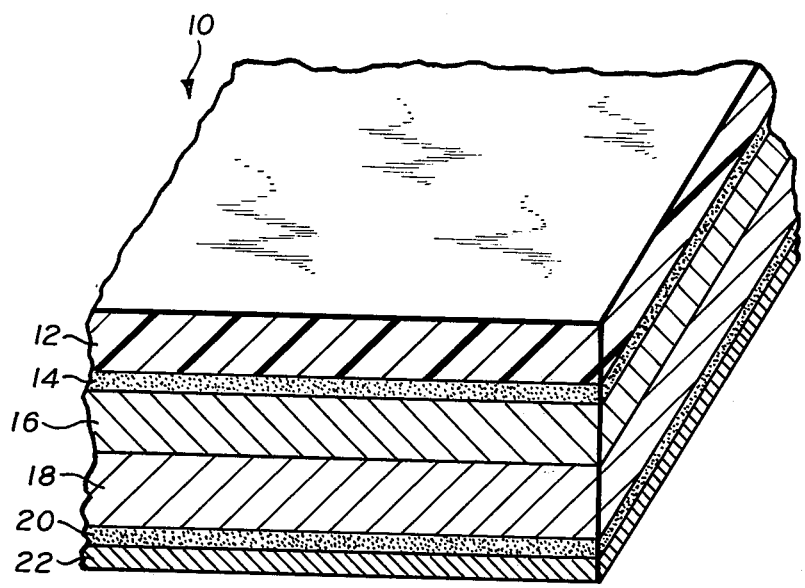

HEAT RESISTANT LAMINATE

BACKGROUND OF THE INVENTION

1. Field of the Invention

This invention pertains to the field of heat resistant laminates. More particularly, this invention concerns a laminated sheet material useful for interior decoration particularly for the facing of furniture and cabinetry.

2. Description of the Prior Art

The use of mar-resistant laminate sheeting for decorative covering of furniture, kitchen counter-tops, cabinetry, and the like is known. Such laminates are used to impart, in addition to mar-resistance, water-resistance and heat-resistance to the surfaces which they cover. These laminate sheeting come in many designs and patterns simulating wood veneer, tile, marble, as well as other decorator type designs and colors.

Conventionally, such laminates are composed of various layers including wood, hard synthetic polymers and resins, hard papers, asbestos, etc., which are laminated together under high pressures. Generally, however, these laminates are characterized by rather high cost for both materials and installation. The installation is particularly costly being that it requires the services of a skilled carpenter. Additionally, the installation time is relatively high.

SUMMARY OF THE INVENTION

We have discovered a new flexible laminate covering which provides superior mar, water and heat resistance to any surface and which is not only relatively inexpensive in cost, but also easy to apply to the surface to be covered.

More particularly, we have discovered a heat resistant flexible coating having a pressure sensitive adhesive on the underside thereof which laminate can be easily applied to any accessible countertop, cabinetry, etc., by the average homeowner.

The laminate of the present invention comprises a first or top flexible, transparent, layer of a polymeric material possessing a high heat resistance, a second flexible layer of a hard surfaced indentation resistant material, a third layer of a flexible, metal foil heat-sink, a fourth layer of a pressure sensitive adhesive, and a bottom layer of a release sheet.

The laminate of the present invention is extremely light in weight yet provides superb mar and heat resistance. It can be fabricated in any type of decorator design or simulated wood or stone veneer and is easily applied to the desired surface simply by cutting to the correct size and shape as with a common household scissors or knife, peeling the release sheet from the bottom of the laminate to expose the pressure sensitive adhesive and thereafter applying and smoothing the laminate onto the surface in the conventional manner.

BRIEF DESCRIPTION OF THE DRAWINGS

The drawing is a cross-sectional view of the present invention.

DESCRIPTION OF THE PREFERRED EMBODIMENT

Referring to the drawing, the present invention comprises a flexible laminate depicted generally at 10 having a top layer 12 of a polymeric film. Suitable polymeric films for use as layer 12 include high molecular weight, polyesters, nylon, acrylonitrile-butadiene-styrene polymers, acetals, acrylics, polycarbonates, epoxy-type polymers, fluoroplastics, polyimides, cellulosics, and the like. This material possesses a high softening point and is heat resistant. By heat resistant, it is meant that this material will withstand temperatures up to about 150 C° without visible charring. Layer 12 is in the form of a transparent thermoplastic film having a thickness in the range from about 0.01 mil to 50.0 mils, preferably from about 0.5 to 10 mils.

Particularly preferred are film forming polyester materials, such as those sold under the Trademarks Mylar, by E. I. DuPont de NeMours and Company, Inc., and particularly types S (smooth shiny surface) and EB11 (matte surface) as described in Bulletin M–1H published by the DuPont Company, Melinex, sold by the Imperial Chemical Industries, Great Britain, and Celanar, sold by Celanese, Inc. Each of these materials are well known and the properties of each are described in brochures published by the manufacturer. Generally, such films are formed from polyethylene terphthalate polymer, having a molecular weight suitable for film forming, are biaxially oriented, possess an ultimate tensile strength ranging from about 18,000 psi. to 45,000 psi., a density of from about 1.377–1.405 grams per cubic centimeter, and a Mullen Bursting Strength of about 60 to 90 psi.

A second layer 16, composed of a sheet of a flexible, hard, material, such as, a hard, calendered paper is adhered to the top layer with an adhesive 14. The fibrous material comprising the second layer 16 may be, in addition, to paper, other fibrous, non-woven materials, e.g., plasticized and unplasticized calendered films, and the like. Basically, this material serves to confer the indentation resistant properties to the laminate 10.

Adhesive layer 14 may be any type of suitable cross-linking, thermosetting type adhesive. Typical adhesives include polyester -isocyanate combinations, e.g., polyesters of ethylene glycol, terphthalic or isophthalic acid, or aliphatic acids having 6– 10 carbon atoms, and flexible cross-linking thermosetting adhesives, e.g., phenol formaldehyde resins, and melamine formaldehyde resins. Suitable adhesives are disclosed in U.S. Pat. Nos. 2,623,031, 2,623,033, and 3,170,833, all of which are incorporated herein by reference. Suitable curing agents for such adhesives are disclosed in U.S. Pat. No. 3,170,833.

If desired, the adhesive may contain a pigment or dye which by virtue of the transparent quality of film 12 will give a decorative appearance to the laminate. Alternately, the adhesive 14 may be transparent and the surface of layer 16 may be printed in a decorative fashion, with suitable dyes which will be visible through transparent layers 12 and 14.

Methods for pigmenting the adhesives as well as dyeing and printing of layer 16 are conventional. However the vehicles with which layer 16 can be imprinted are preferably selected from the urea or melamine formaldehyde alkyds which possess the required heat resistance and bonding properties. Other suitable vehicles include vinyl butyrals, polyesters, polyurethanes, etc.

Layer 18 is a heat sink layer which is composed of a flexible material having a high thermal conductivity. Typically, most metal sheets or foils can be used, e.g., copper, tin, and aluminum, etc., for this purpose. Preferably, the metal foil layer has a thickness of greater than about 0.75 mils.

The heat sink layer 18 is adhered to the indentation resistant layer 16 by the use of conventional heat resistant adhesives which are suitable for bonding paper, fibrous materials or plastic to metal. Typical adhesives include cross-linking polyesters, phenolformaldehyde resins, melamine formaldehyde resins, heat resistant acrylics, heat resistant polyvinyl acetate polymers and co-polymers, heat resistant polyesters, etc.

Coated on the bottom of heat sink layer 18 is a pressure sensitive adhesive 20. The class of adhesives suitable for use in the present invention are well known in the art. Generally, such an adhesive comprises a two component system, one component of which is a polymer or resin which is intrinsically tacky, such as a tacky elastomer or has intermixed therewith a resin imparting tackiness and a second component which is a tack controlling component to reduce the tack of the adhesive layer to the desired peel bond value. The second component also imparts cutting or shearing properties to the adhesive layer so that it will cut when the transferable film is cut or will shear as the carrier shears or is lifted away from the receiving surface. Such shearing or cutting properties are achieved by materials of low tensile strength.

The second component is preferably a readily deformable material in order to allow the adhesive layer to make adequate contact with the receiving surface which may be rough in texture. The tack controlling component may be used in concentrations of from about 6 to 65 parts per 100 parts of the total tacky compound.

Intrinsically tacky polymers include polyacrylic or methacrylic esters and acids; polyvinyl ethers; co-polymers of vinyl ethers and the aforesaid acrylic compounds; polyisobutylene and polybutenes; natural rubber; synthetic polyisoprene; polyvinylesters; polychloroprene; polybutadiene and co-polymers of polybutadiene with styrene.

Tackifying resins include hydrocarbon resins, terpene resins such as polybeta-pinene resin; resin derivatives such as hydrogenated resin and esters and liquid mixtures of polymeric styrene and homologues. Preferred materials are polyvinylbutylether; polyvinylethylether; polyvinylmethylether; polybutylacrylate or co-polymers of butylacryate and methacrylate.

A detailed description of such materials is set forth in U.S. Pat. No. 3,432,376 incorporated herein by reference.

The bottom layer 22 of the laminate comprises a release sheet. Many types of suitable release sheets or release papers are conventional in the art. Generally, the most well known and economical type release sheet used presently, is an unbleached kraft paper directly coated on both sides with a cured silicone. It is possible however to use other papers such as a bleached kraft glassine, spun bonded synthetic fibers, i.e. polyethylene or continuous films of extruded polyesters, cellophane and the like which possess release properties in the untreated state. Generally, however, the inherent release properties of such films are not sufficient and must be improved by coating with release compositions such as the cured silicones mentioned hereinabove.

Methods for preparing the release papers are well known. Typically, the paper is dipped into a bath of a silicone release agent and then cured. Such methods are described in U.S. Pat. No. 3,503,782, incorporated herein by reference.

Overall, the laminate of the present invention should possess a surface heat resistance of greater than about 150°C and resistance to charring from a lighted cigarette, the lighted cigarette being in direct contact with the top surface of the laminate. Additionally, the sheet should have sufficient flexibility to pass a test wherein it is rolled into a 2 inch diameter core and creased 180° without breaking or cracking.

Overall, the laminate of the present invention will have a thickness of at least about 5.0 mils, and preferably in the range from about 5.0 to 20 mils.

The following is an example of a preferred embodiment of a laminate in accordance with the present invention:

1. A polyester film having a thickness of 0.75 mils, e.g., Mylar Type S or EB11, Melinex, or Celanar.
2. A flexible cross-linked thermoset adhesive (a polyester copolymer formed from ethylene glycol, terphthalic acid and isophthalic acid and an isocyanate curing agent therefor) applied in an amount of 0.10 ounces per square yard;
3. Paper printed with dyeing inks (0.0035 inches thick, bottle-cap-type-super calandered on both sides and having a hardness of D/51/1 as determined by the ASTM D–2240–68 test for indentation hardness of rubber and plastic by means of a durometer.)
4. A layer of flexible cross-linked thermoset adhesive applied in an amount of 0.10 ounces per square yard;
5. Aluminum foil having a thickness of 0.75 mils;
6. A pressure sensitive adhesive of an acrylic polymer-based material in an amount of 1.25 ounces per square yard; and
7. A release sheet of a bleached kraft paper which is coated on both sides with polyethylene.

The laminate of the present invention may be prepared by applying the laminating adhesive to the polymeric film by gravure coating although other coating methods may be used. The solvents in the adhesive may then be evaporated off at conventional temperatures, e.g., 190°F to 250°F. The thus coated polymeric film is then laminated under pressure to the printed paper or indentation resistant material. Typically, lamination pressures are in the range from about 25 to 50 psi and lamination temperatures are in the range from about 250° to 300°F.

Thereafter, the laminating adhesive is applied to the paper side of the polyester film/paper laminate and again the solvent is evaporated off. The laminate thus obtained is then pressure laminated to the metal foil with a conventional laminating roller at room temperature.

Thereafter, the pressure sensitive adhesive may be applied to the metal foil by methods well known to the art, e.g., a transfer method utilizing the release backing sheet. Normally, what is done is simply to apply the pressure sensitive adhesive to the release sheet and then marry the laminate to the release sheet.

Variations can, of course, be made without departing from the spirit and scope of the invention.

Having thus described our invention, what we desire to secure and claim by Letters Patents is:

1. A flexible heat resistant laminate comprising a series of layers bonded together, said layers consisting essentially of a top layer of a transparent polyester film having a high softening point, a second layer of a hard surfaced, flexible non-woven, fibrous strengthening and indentation resistant material, a third layer of a flexible metal foil heat sink, a fourth layer of a pressure-sensitive adhesive, and a bottom layer of a release sheet.

2. The laminate of claim 1 wherein the second layer is a hard calendered paper sheet.

3. The laminate of claim 1 wherein the third layer is a metal foil selected from the group consisting of copper, tin and aluminum.

4. The laminate of claim 1 wherein the release sheet is a paper coated with a release material.

5. The laminate of claim 1 wherein the laminate has an overall thickness of about 5.0 – 20.0 mils, and is sufficiently flexible that it neither breaks nor cracks when it is rolled into a 2 inch diameter cylinder and creased 180°.

6. The laminate of claim 1 wherein the polyester top layer has a thickness in the range from about 0.01 to 50 mils and wherein the foil has a thickness greater than about 0.75 mils.

7. The laminate of claim 2 wherein the surface of the paper layer is decorated.

8. The laminate of claim 7 wherein the surface of the paper layer is decorated with a mixture of a cross-linking, thermosetting urea-formaldehyde alkyd containing vehicle and a pigment.

* * * * *